No. 714,451. Patented Nov. 25, 1902.
G. C. CARSON.
CONTINUOUS CONVERTER.
(Application filed Aug. 30, 1901. Renewed Aug. 27, 1902.)
(No Model.)
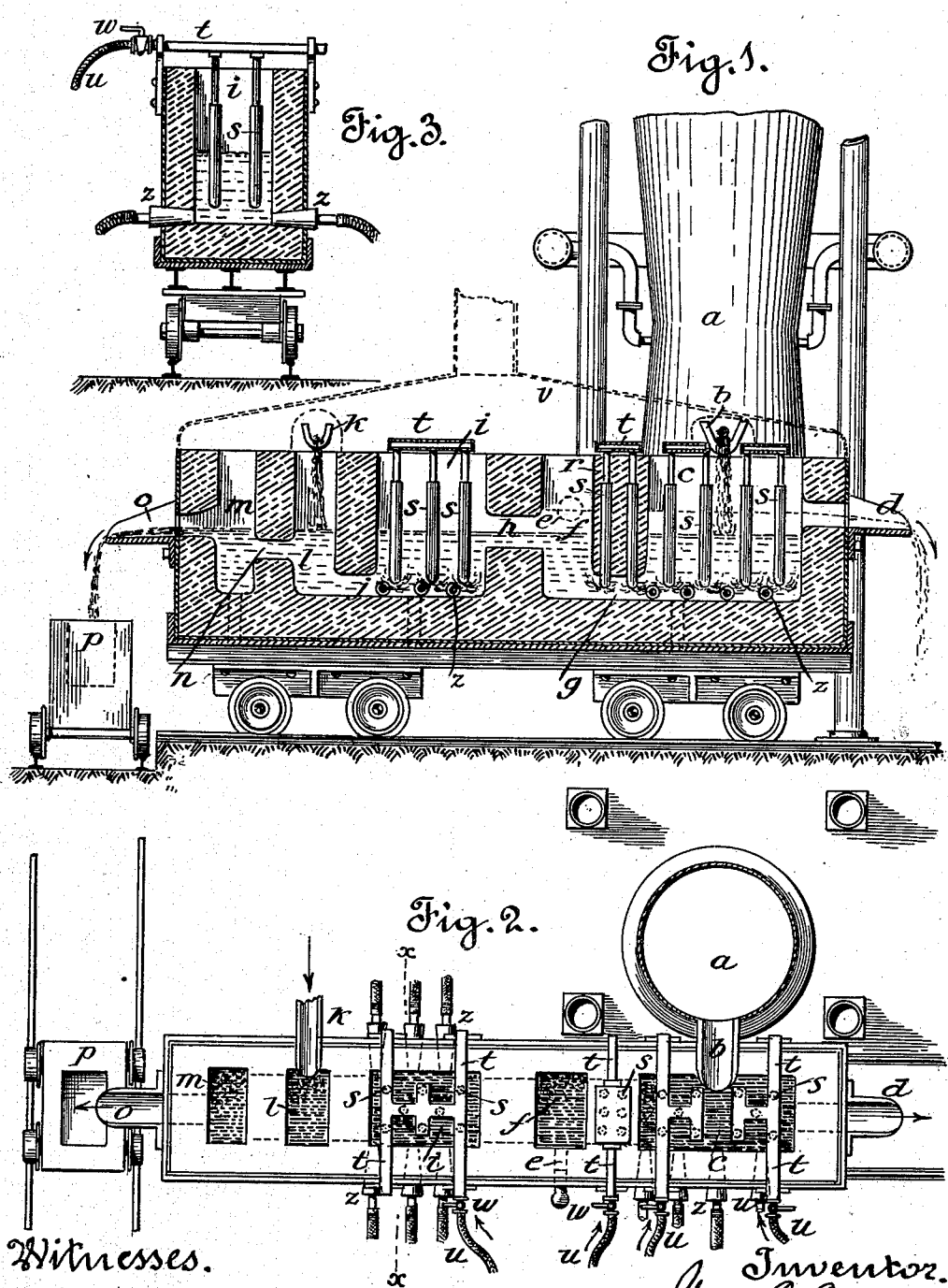
Witnesses.
Inventor.
George C. Carson

UNITED STATES PATENT OFFICE.

GEORGE C. CARSON, OF REDDING, CALIFORNIA, ASSIGNOR OF TWO-THIRDS TO ALBERT MILLER, OF WASHINGTON, DISTRICT OF COLUMBIA, AND FRED HURST, OF REDDING, CALIFORNIA.

CONTINUOUS CONVERTER.

SPECIFICATION forming part of Letters Patent No. 714,451, dated November 25, 1902.

Application filed August 30, 1901. Renewed August 27, 1902. Serial No. 121,262. (No model.)

*To all whom it may concern:*

Be it known that I, GEORGE C. CARSON, a citizen of the United States, residing at Redding, in the county of Shasta and State of California, have invented certain new and useful Improvements in Continuous Converters, of which the following is a specification.

My invention relates to apparatus for the treatment of metals for converting metallic mattes into bullion or for converting fused pig-iron into malleable iron and steel.

My invention as embodied in apparatus comprises a continuous converter divided into separate compartments having communications between them, thus forming a continuous converter, the metal flowing through the series of compartments, which are so arranged that separate treatment can be given the metal at different points—for instance, in treating pig-iron the fused material is delivered by the blast-furnace into a primary compartment, where it is desiliconized by the addition of currents of oxygen and from which the silica passes off, thereby saving the lime which would be neutralized were the operation of conversion carried on in a single vessel. In a subsequent compartment, and particularly when phosphoric iron is being treated, the phosphate of lime can be separated as a commercial by-product. A construction by which these and other advantages hereinafter explained are secured is illustrated in the accompanying drawings, in which—

Figure 1 is an elevation of part of a blast-furnace and a longitudinal section of my converter arranged in operative relation thereto. Fig. 2 is a plan of the converter. Fig. 3 is a cross-section of the same at $x$ $x$, Fig. 2.

$a$ represents a blast-furnace, shown as of a type well known in the production of pig-iron from iron ores, but which can be of any other form or type adapted for reducing metals from their ores or for resmelting metals for further treatment. The converter is of substantially rectangular form and is preferably mounted upon wheel-trucks, so that it can be removed and replaced by another when desirable for any reason.

The converter is provided with a series of communicating compartments, which are shown as five in number. The compartment $c$ occupies the end of the converter adjacent to the furnace and receives the molten metal through a spout $b$. It is provided with an outlet and spout $d$. A wall separates compartment $c$ from the next compartment $f$, a communicating passage $g$ being provided at the bottom beneath said wall. Compartment $f$ is separated from compartment $i$ by a wall containing a port or passage $h$, to which the molten metal is compelled to rise in compartment $f$ to find an exit. Compartment $i$ is separated from compartment $l$ by a wall, beneath which is the communicating port or passage $j$. Compartment $l$ is separated from the last compartment $m$ by a wall, having a port or passage $n$ above the converter's bottom. Compartment $m$ is provided with spout $o$, discharging into a chill $p$, preferably portable and carried on wheels, as shown. The walls of the converter and its compartments are of suitable refractory material, and the linings are of a character suitable to the kind of metal under treatment. Thus in converting iron the lining of compartment $c$ will be an acid lining, and the linings in compartments $f$ and $i$ will be basic linings, so that in all cases they will be neutral to the slags and better withstand the scorifying of the slags.

In compartments $c$ and $i$ are arranged the required number of blowpipes $s$, constructed of carbon or other suitable refractory material and arranged to receive air under pressure and discharge it into the molten metal. The blowpipes can be carried through the converter-lining, if desired, as illustrated in Fig. 1, where they are embedded in the wall $r$. As a matter of convenience in illustration I have shown them as connected to headers $t$, so that one may be withdrawn and a new jet inserted. With them communicate adjustable pipes $u$, having controlling-cocks $w$, so that the supply of oxygen is under complete external control as respects individual blowpipes and compartments.

In operating the converter, and supposing that pig-iron is the metal under treatment, the metal flows from the furnace into compartment $c$ through spout $b$ and oxygen is forced into the molten mass through the blowpipes. In pig-iron the metalloid silicon has a greater affinity for oxygen if kept below a critical temperature, and in compartment $c$ the temperature can be kept down, as desired, by the addition of iron and steel scrap. The oxygen is seized by the silicon to form the compound silica, which rises to the surface, being a slag and having less specific gravity than the metal, and escapes through spout $d$. The desiliconized iron flows from the bottom of compartment $c$ through port $g$, rises in compartment $f$, and is delivered at the surface of the metal in compartment $i$ through port $h$. In compartment $i$ the metal is treated with oxid of lime and, if desired, with oxidized ores. When oxygen is supplied to the molten metal through blowpipes, the metal will be dephosphorized, desulfurized, and decarbonized in that compartment. The added oxid of lime rescues the phosphoric acid when it comes to the surface, and the cinder formed on the surface flows back through port $h$ into compartment $f$ and is removed through tap-hole $e$, it being a phosphate of lime and a commercially valuable by-product. The converted metal flows through port $j$ into compartment $l$, which is provided with a spout $k$, through which the metal can be recarbonized or alloyed. The last compartment $m$ communicates with compartment $l$ by a raised port $l'$ and is a reservoir in which the steel accumulates and from which it can be tapped into the chill $p$ through spout $o$. The chills are preferably mounted on trucks and run under spout $o$ as required.

As a modification in the means of supplying oxygen to the compartment C, I can use twyers Z, entering from the outside on the hearth-line, as shown in Fig. 3. By using twyers in this position a great quantity of scrap material can be melted, the reduction of scrap-supply being a serious problem in large steel works. Therefore in cases where it is preferable to use such twyers either instead of or in connection with blowpipes arranged as previously described I desire to do so.

This converter can also be used in converting mattes, such as those of copper or lead. The fused ores flow from the furnace into compartment $c$, where the metallic mattes settle at the bottom, while the slag floats off at spout $d$, no blowpipes being used in compartment $c$ in this case. The matte flows through passage $g$ into compartment $f$ and is delivered through the raised port $h$ to the surface of the metal in compartment $i$. In compartment $i$ are arranged the required number of blowpipes, as before described, by which oxygen is supplied for the agitation of the metal and the combustion of the impurities of the matte which rise to the surface and can be tapped out of the compartment through a tap-hole arranged in any convenient position. The bullion settles to the bottom of compartment $i$ and then flows through port $j$. In this case compartments $l$ and $m$ may form one chamber without the separating-wall shown in Fig. 1, and from such compartment the bullion can be tapped into ingot-molds as desired.

Any convenient hood, as shown at $v$, can be arranged over the converter having an outlet or stack to carry away waste gases, and it is desirable to supply tap-holes at the bottoms of compartments $c$, $i$, and $m$ in order to drain the metal from the converter when linings are to be repaired or for any other purpose.

Having thus fully described my invention, what I claim as new, and desire to secure by Letters Patent, is—

1. In a converter, a primary compartment having a slag-outlet, means for feeding molten metal into said primary compartment, a secondary compartment, an intermediate partition between the two having a port at the bottom level of both compartments, a tertiary compartment communicating with said secondary compartment by a passage above the bottom, and air-pipes entering said tertiary compartment, substantially as described.

2. In a converter, a primary compartment having a slag-spout, means for supplying air to said compartment, a second compartment communicating with said primary compartment at the bottom thereof, a third compartment communicating with said second compartment above the bottom thereof, means for supplying air to said third compartment, and a fourth compartment communicating with said third compartment at the bottom thereof, substantially as described.

3. In a converter, a primary compartment having an inlet for molten metal and having a slag-outlet, means for supplying air to said compartment, a second compartment communicating with said first-named compartment at the bottom thereof, a third compartment communicating with said second compartment above the bottom, means for supplying air to said third compartment, a tap-hole in said second compartment, and an outlet from said third compartment, substantially as described.

4. In a converter, a primary compartment with means for supplying molten material thereto, said compartment having a slag-outlet, a second compartment communicating therewith at the bottom and having a tap-hole above the bottom thereof, a third compartment having communication with said second compartment above the bottom, means for supplying air to said first and third compartments, a fourth compartment communicating with said third compartment at the bottom, a fifth compartment communicating with said fourth compartment above the bottom and an outlet from said fifth compartment, substantially as described.

In testimony whereof I have affixed my signature, in presence of witnesses, this 21st day of July, 1901.

GEO. C. CARSON.

Witnesses:
  THOMAS J. LOFTUS,
  H. O. WICKES,
  J. R. STODDARD.